US011493592B2

(12) United States Patent
Lo Monte et al.

(10) Patent No.: US 11,493,592 B2
(45) Date of Patent: Nov. 8, 2022

(54) RADIO FREQUENCY IDENTIFICATION (RFID) SYSTEM FOR DETERMINING LOCATION

(71) Applicant: Lion Group, Inc., Dayton, OH (US)

(72) Inventors: Lorenzo Lo Monte, Huntington, NY (US); Daniel Labarowski, Mason, OH (US); Daniel Wetzel, Kettering, OH (US); Steven C. Schafer, Beavercreek, OH (US); Michael C. Wicks, Utica, NY (US); Andrew E. Bogle, Beavercreek, OH (US); Daryl M. Osterloh, Dayton, OH (US); Devin Smarra, Beavercreek, OH (US); Devin Spatz, Beavercreek, OH (US)

(73) Assignee: Lion Group, Inc., Dayton, OH (US)

( * ) Notice: Subject to any disclaimer, the term of this patent is extended or adjusted under 35 U.S.C. 154(b) by 117 days.

(21) Appl. No.: 17/209,198

(22) Filed: Mar. 22, 2021

(65) Prior Publication Data
US 2021/0270931 A1 Sep. 2, 2021

Related U.S. Application Data

(63) Continuation of application No. 15/816,808, filed on Nov. 17, 2017, now Pat. No. 10,989,788.
(Continued)

(51) Int. Cl.
*G01S 5/06* (2006.01)
*G01S 13/00* (2006.01)
(Continued)

(52) U.S. Cl.
CPC .............. *G01S 5/06* (2013.01); *G01S 5/0231* (2013.01); *G01S 5/12* (2013.01); *G01S 13/003* (2013.01);
(Continued)

(58) Field of Classification Search
CPC . G01S 5/0231; G01S 5/06; G01S 5/12; G01S 7/023; G01S 13/003; G01S 13/42;
(Continued)

(56) References Cited

U.S. PATENT DOCUMENTS 3,701,150 A   10/1972 Dame
4,163,232 A * 7/1979 Fitzsimmons .......... G01S 13/82
                                                  342/187
(Continued)

FOREIGN PATENT DOCUMENTS

CN    103550892 A   2/2014
GB      2238210 A   5/1991
(Continued)

OTHER PUBLICATIONS

Chaniotakis et al., "Frequency Response: Resonance, Bandwidth, Q factor," 11 pages, Spring 2006, https://ocw.mit.edu/courses/electrical-engineering-and-computer-science/6-071j-introduction-to-electronics-signals-and-measurement-spring-2006/lecture-notes/resonance_qfactr.pdf.
(Continued)

*Primary Examiner* — Bernarr E Gregory
*Assistant Examiner* — Fred H Mull
(74) *Attorney, Agent, or Firm* — Mintz Levin Cohn Ferris Glovsky and Popeo, P.C.

(57) ABSTRACT

A system and bent-pipe transponder component for determining a location of an individual or object in three dimensional space. The system includes a transmitter configured to transmit a first wireless electromagnetic signal at a first frequency and at least one transponder that is configured to responsively emit a second wireless electromagnetic signal having a second frequency that is frequency-shifted from the first frequency. An included receiver detecting the first and second wireless electromagnetic signals is configured to
(Continued)

provide an output of location information for the at least one transponder. A bent-pipe transponder component may include a receiving antenna, an emitting antenna, and a frequency shift stage comprising an oscillator and a first mixer, with the frequency stage mixing a received first wireless electromagnetic signal with the output of the oscillator via the first mixer to produce the emitted second wireless electromagnetic signal.

12 Claims, 11 Drawing Sheets

Related U.S. Application Data

(60) Provisional application No. 62/423,528, filed on Nov. 17, 2016.

(51) Int. Cl.

| | |
|---|---|
| *G01S 13/82* | (2006.01) |
| *G01S 13/42* | (2006.01) |
| *G01S 5/12* | (2006.01) |
| *G01S 13/88* | (2006.01) |
| *G01S 13/76* | (2006.01) |
| *G01S 5/02* | (2010.01) |
| *G01S 7/02* | (2006.01) |
| *G01S 13/02* | (2006.01) |

(52) U.S. Cl.
CPC .............. *G01S 13/42* (2013.01); *G01S 13/76* (2013.01); *G01S 13/82* (2013.01); *G01S 13/888* (2013.01); *G01S 7/023* (2013.01); *G01S 2013/0245* (2013.01)

(58) Field of Classification Search
CPC ...... G01S 13/753; G01S 13/76; G01S 13/767; G01S 13/82; G01S 13/878; G01S 13/888; G01S 2013/0245; G01S 13/758; G01S 13/784; G01S 13/825; G06K 2017/0045
USPC ................................................... 342/44, 133
See application file for complete search history.

(56) References Cited

U.S. PATENT DOCUMENTS

| | | | |
|---|---|---|---|
| 4,307,397 | A | 12/1981 | Holscher |
| 4,804,961 | A | 2/1989 | Hane |
| 5,613,197 | A | 3/1997 | Copeland et al. |
| 6,150,921 | A | 11/2000 | Werb et al. |
| 6,351,215 | B2 | 2/2002 | Rodgers et al. |
| 6,614,239 | B2 | 9/2003 | Borghi |
| 6,965,344 | B1 | 11/2005 | Halsey et al. |
| 7,109,844 | B2 | 9/2006 | Taki et al. |
| 7,242,259 | B2 | 7/2007 | Heide et al. |
| 7,242,303 | B2 | 7/2007 | Patel et al. |
| 7,424,271 | B2 | 9/2008 | Shih et al. |
| 7,511,604 | B2 | 3/2009 | Raphaeli et al. |
| 7,605,696 | B2 | 10/2009 | Quatro |
| 7,633,387 | B2 | 12/2009 | Carmichael et al. |
| 7,737,850 | B2 | 6/2010 | Malik |
| 7,855,639 | B2 | 12/2010 | Patel et al. |
| 7,868,760 | B2 | 1/2011 | Smith et al. |
| 8,138,919 | B2 | 3/2012 | Christopher |
| 8,188,908 | B2 | 5/2012 | Landt |
| 8,334,808 | B2 | 12/2012 | Remez et al. |
| 8,599,011 | B2 | 12/2013 | Schantz et al. |
| 8,981,927 | B2 | 3/2015 | McSheffrey |
| 9,014,635 | B2 | 4/2015 | Sadr et al. |
| 9,291,699 | B2 | 3/2016 | Sadr et al. |
| 9,367,785 | B2 | 6/2016 | Sabesan et al. |
| 10,129,704 | B1 | 11/2018 | Huseth et al. |
| 2003/0007473 | A1 | 1/2003 | Strong et al. |
| 2005/0237953 | A1 | 10/2005 | Carrender et al. |
| 2005/0270158 | A1 | 12/2005 | Corbett |
| 2006/0044179 | A1 | 3/2006 | Fossum |
| 2006/0250271 | A1 | 11/2006 | Zimmerman |
| 2008/0068267 | A1 | 3/2008 | Huseth et al. |
| 2008/0122696 | A1 | 5/2008 | Huseth et al. |
| 2009/0033500 | A1 | 2/2009 | Malik et al. |
| 2010/0109844 | A1 | 5/2010 | Carrick et al. |
| 2010/0271179 | A1 | 10/2010 | Maltseff |
| 2010/0277338 | A1 | 11/2010 | Laroche |
| 2011/0187600 | A1 | 8/2011 | Landt |
| 2011/0221632 | A1* | 9/2011 | Fretenburg ............ G01S 13/878 342/387 |
| 2012/0280862 | A1 | 11/2012 | Moffatt et al. |
| 2013/0194100 | A1 | 8/2013 | Granhed et al. |
| 2015/0108210 | A1 | 4/2015 | Zhou |

FOREIGN PATENT DOCUMENTS

| | | | |
|---|---|---|---|
| WO | WO-2016164031 | A1 | 10/2016 |
| WO | WO-2018094229 | A1 | 5/2018 |

OTHER PUBLICATIONS

Cho, C. et al., "Passive Wireless Frequency Doubling Antenna Sensor for Strain and Crack Sensing," IEEE Sensors Journal, vol. 16, No. 14, pp. 5725-5733, Jul. 16, 2016.
"Coplanar Waveguide," 3 pages, first publication at least as early as 2014, https://www.microwaves101.com/encyclopedias/327-coplanar-waveguide-microwave-encyclopedia-microwaves101-com.
DeMartino, C., "6 Types of Resonators Used Across the RF/Microwave Universe," 11 pages, Sep. 9, 2015, http://www.mwrf.com/components/6-types-resonators-used-across-rfmicrowave-universe.
EP, Search Report, European Application No. 17871214.7, 9 pages (dated May 26, 2020).
"Firefighter location technology: What's available", Fire Rescue news, 6 pages, https://www.firerescue1.com/fire-products/communications/articles/2022412-Firefighter-location-technology-Whats-available/, Dec. 14, 2014.
Galdorisi, G. et al., Leave No Man Behind, Hudson, WI, BMI Publishing, p. 391, 2009.
"GLANSER System Locates and Tracks Firefighters in Buildings," Fire Apparatus & Emergency Equipment, 4 pages, Apr. 1, 2012.
"GLANSER: A Scalable Emergency Responder Locator System", WPI Workshop, 21 pages, Aug. 1, 2011, https://web.wpi.edu/Images/CMS/ECE/GLANSER_-_WPI_PPL_2011_-_AmitKulkarni-Aug1(1).pdf.
"GPS Basics," 9 pages, first publication at least as early as 2013, https://learn.sparkfun.com/tutorials/gps-basics.
Lau, Z., "A No-Tune 2-Meter Bandpass Filter," QST, pp. 54-55, May 2000.
Lewis, M. "Surface Skimming Bulk Waves," Ultrasonic Symposium Proceedings, pp. 744-752, 1977.
"Lithium Battery Failures," Electropaedia, Battery and Energy Technologies, 5 pages, first publication at least as early as 2011, http://www.mpoweruk.com/lithium_failures.htm#breakdown.
McKenna, C., RFID System Tracks Firefighters in Real Time, Improves Incident Management, featured on Government Technology, 2 pages, 2010, http://www.govtech.com/featured/RFID-System-Tracks-Firefighters-in-Real.html.
Moell, J., "Transmitter Hunting: Tracking Down the Fun—Part 1," QST, pp. 48-51, Apr. 1993.
Murata Manufacturing Co., product datasheet for SF2038B, 76.500 MHz SAW Filter, Mar. 27, 2014.
"Navigating Budget Cuts," Taxpayers for Common Sense, 2 pages, Jan. 15, 2010, http://www.taxpayer.net/budget-appropriations-tax/navigating-budget-cuts/.
New Technology Could Help Track Firefighters for Safety, Fire Apparatus & Emergency Equipment, 2 pages, http://www.fireapparatusmagazine.com/articles/pt/2016/12/new-technology-could-help-track-firefighters-for-safety.html?cmpid=enl_FAEE_FireApparatusWeekly_2016-12-28&email_address=mwaterhouse@bullex.com&eid=293172460&bid=1621949, Dec. 19, 2016.

(56) References Cited

OTHER PUBLICATIONS

"On Scene Firefighter Personnel Tracking Products," 2 pages, http://www.firecommand.org/on-scene-firefighter-personnel-tracking-products/2016.

PCT, International Search Report and Written Opinion of the International Searching Authority, International Application No. PCT/US2017/062332, 12 pages, dated Feb. 16, 2018.

"Precision Outdoor and Indoor Navigation and Tracking for Emergency Responders (POINTER)," DHS Science and Technology Directorate, U.S. Department of Homeland Security, 1 page (Jan. 11, 2016).

Product literature entitled "The fastest way to wireless." featuring AC4490 900MHz transceiver by AEROCOMM, 2 pages, https://media.digikey.com/pdf/Data%20Sheets/Laird%20Technologies/AC4490.pdf, first publication at least as early as Sep. 20, 2005.

Psychoudakis, D. et al., "A Portable Low-Power Harmonic Radar System and Conformal Tag for Insect Tracking," IEEE Antennas and Wireless Propagation Letters, vol. 7, pp. 444-447, 2008.

"Ramp-AC RF DVK Hardware User's Guide Version 1.0", by Laird, 10 pages, 2014.

ResponderX article entitled "Bryan (TX) Startup to Unveil New Firefighter Accountability Technology," Fire Engineering, 2 pages, http://www.fireengineering.com/articles/fdic/2017/04/responderx-firefighter-technology.html?cmpid=enl_fe_fireengineeringdaily_2017-04-19&email_address=mkrolick@bullex.com&eid=293126198&bid=1729837, Apr. 19, 2017.

ResponderX photographs of the Innovation Underground Grand Opening Party, 5 pages, https://www.facebook.com/responderx/photos/a.535817486575474.1073741830.480461448777745/535817499908806/?type=3&theater, Oct. 17, 2015.

ResponderX photograph of prototype system with AC4490LR transceiver (by AEROCOMM), 2 pages, https://www.facebook.com/responderx/photos/a.525639017593321.1073741829.480461448777745/680590455431509/?type=3&theater, first publication at least as early as Sep. 19, 2016.

ResponderX photograph of system with RF development board with AC4490 transceiver (by Laird), https://www.facebook.com/responderx/photos/a.517904071700149.1073741828.480461448777745/517904045033485/?type=3&theater, first publication at least as early as Sep. 1, 2015.

ResponderX web page regarding TaskForceTracker, https://responderx.com, 9 pages, 2017.

"S&T's POINTER System More Precisely Pinpoints First Responder Locations," Science and Technology, U.S. Department of Homeland Security, 2 pages (Jan. 5, 2016).

Stimson, G.W., Airborne Radar (2nd Edition), Raleigh, N.C., Sci-Tech Publishing Inc., pp. 6, 7, 19 and 100, 1998.

Web page featuring "ResponderX Official—You Tube", featuring two (2) on-line video presentations, entitled "TaskForceTracker from ResponderX" (Sep. 2016) and "Introducing TaskForceTracker", https://www.youtube.com/channel/UCF3qxwwO84bqGMSp2FHrnmA, Jul. 2016.

Web page featuring "TaskForceTracker from ResponderX—You Tube", featuring on-line video presentation entitled "TaskForce Tracker from ResponderX" https://www.youtube.com/watch?v=Vj54Ulk_Bss&feature=youtu.be&t=107, 2 pages, Sep. 1, 2016.

Web page of Crowdrise featuring "TaskForceTracker: A New Way to Help First Responders," https://www.crowdrise.com/taskforcetracker-a-new-way-to-help-first-responders/ , 2 pages, first publication at least as early as Sep. 7, 2016.

Zack, K. et al., "Compact Spiral Antenna for Space Based Applications," Antennas and Propagation Society International Symposium (APSURSI), IEEE 2014, pp. 1708-1709.

AU Examination Report, Australia Application No. 2017362444, 3 pages, (dated Sep. 7, 2021).

AU Second Examination Report, Australia Application No. 2017362444, 3 pages, (dated Jun. 6, 2022).

* cited by examiner

RADIO FREQUENCY IDENTIFICATION (RFID) SYSTEM FOR DETERMINING LOCATION

CROSS REFERENCE TO RELATED APPLICATIONS

This application is a continuation of U.S. patent application Ser. No. 15/816,808 filed Nov. 17, 2017, entitled "RADIO FREQUENCY IDENTIFICATION (RFID) SYSTEM FOR DETERMINING LOCATION," which claims priority to U.S. Provisional Patent Application 62/423,528 filed Nov. 17, 2016, entitled "RADIO FREQUENCY IDENTIFICATION (RFID) SYSTEM FOR DETERMINING LOCATION," the contents of which are hereby incorporated by reference in their entirety.

BACKGROUND

Some fire departments may use accountability systems to identify which firefighters are on-site at an incident and, particularly, which are deployed within a building or structure. Such accountability systems track the status of firefighters as present and/or as having entered and exited a building; however, such systems are unable to provide geolocation within a building. In order to track firefighters within a building, additional technologies such as global positioning systems (GPS), Wi-Fi, and other wearable systems may be employed.

GPS systems are well-known and widely available. However, GPS signals rapidly deteriorate within a building, which weakens the ability of this approach to determine the location of an individual after entry. Alternately, wearable Wi-Fi emitters may be used to advertise the location of an individual. The reader will appreciate that Wi-Fi tracking systems typically use trilateralization and/or triangulation to determine the location of an emitter, where trilateralization uses received signal strength or time-of-flight to determine the distance to an emitter and triangulation uses angle of arrival to determine direction to an emitter, and that both methods can require placing a set of distributed receivers around a building at known or determined locations. However, it is often time consuming to distribute receivers around a building at previously determined locations and/or to determine the position of a newly selected location. Thus, this approach may not be practical during an urgent situation such as a fire.

Inertial systems using doubly integrated accelerometer data may track and report movement away from a starting point. However, the localization accuracy of an inertial tracking system decreases over time due to accumulated errors, even during periods when an individual remains stationary. Thus, this approach may not be practical since the starting location of each firefighter would have to be the same or otherwise known, and the reported location of each firefighter would become less and less accurate over time.

Finally, through-the-wall radar systems have been used to locate targets behind walls and inside buildings. However, these radar systems frequently lack the ability to discern a target, such as a firefighter or other first responder, from background objects and clutter, such as furniture, debris, lumber, or thick vegetation. This issue is further exacerbated at distances of about forty meters or more from the radar system transceiver, so that this approach may be unusable for large and/or densely stocked structures such as warehouses and factories, or even smaller structures for which there is limited access and/or a need to maintain a large standoff distance.

Accordingly, there is a need for a reliable, accurate, and economical system for determining the location of individuals within mixed environments that include buildings or other structures.

SUMMARY

A first embodiment is a system for tracking individuals in three dimensional space, and providing an output. The reader will appreciate that although a system for tracking firefighters or other first responders is described, the disclosure is not limited to this specific application. Indeed, the disclosed systems and methods may be used in other embodiments for tracking objects, such as equipment, within three dimensional space. In still other embodiments, the system may be used for monitoring the location of a nominally fixed location, such as a wall or ceiling of a building, within three dimensional space.

The system can include a transmitter that transmits a first wireless electromagnetic signal, such as a pulsed signal, a frequency modulated continuous wave, and/or an orthogonal frequency division multiplexed signal, in the radio or microwave frequency range.

The system can also include a number of transponders that may be secured to individuals, (and/or, in other embodiments, objects other than people and nominally fixed locations). The reader will appreciate that although multiple transponders are described, "a number" may include only one transponder, and the plural "transponders" will be used to refer to one or more transponders throughout this application. The transponders are configured to receive the first wireless electromagnetic signal and to responsively emit a second wireless electromagnetic signal, such as the same pulsed signal or frequency modulated continuous wave, in the radio or microwave frequency range. Each transponder includes a frequency shift stage such that the second wireless electromagnetic signal is responsively emitted at a different frequency relative to that of the first wireless electromagnetic signal. In other embodiments, each transponder may be configured to emit the second wireless electromagnetic signal at a different frequency relative to that of the first wireless electromagnetic signal and the frequencies of the second wireless electromagnetic signals emitted by the other transponders.

The system can further include a receiver that detects and processes the second wireless electromagnetic signals emitted by the transponders. The receiver has an array of antenna elements distributed across a three dimensional volume of space. In some constructions, the receiver may be at the same location as, and physically coupled to, the transmitter. In other constructions, the receiver may be separated from, but operatively coupled to, the transmitter. The physical or operative coupling of the receiver and transmitter provides an input to the receiver for time-of-flight information concerning the first wireless electromagnetic signal, where such input is used with a respective second wireless electromagnetic signal to determine the distance to a respective transponder.

The receiver provides an output of location information for the number of transducers. The output may be a visual or representative output on a display screen that shows the location of individual responders relative to each other and/or a building and/or geographic indicators such as streets or geographic information system (GIS) data. For example, the receiver may include the display screen, with the output being the displayed visual or representative output. The output may alternately be data, including the location information, that is transmitted to a remote device. For example, the receiver may transmit location information to an application executing on a tablet device, a mobile phone, a desktop computer, a laptop computer, or the like that displays the visual or representative output.

By emitting a frequency-shifted response signal, each transponder can be easily identified by the receiver as being distinct from the emissions of the transmitter and backscattered reflections of the first wireless electromagnetic signal. Each transponder may, in some constructions, be a solely analog transponder and lack any digital electronics, digital processing circuitry, digital signal processors, or the like. Thus, each transponder may be considered a "dumb" transponder that does not attach or append any signals, stored data, or identification information to the emitted response signal, and instead merely repeats the transmitter's signal as a frequency-shifted response signal.

DETAILED DESCRIPTION

Figure 1:
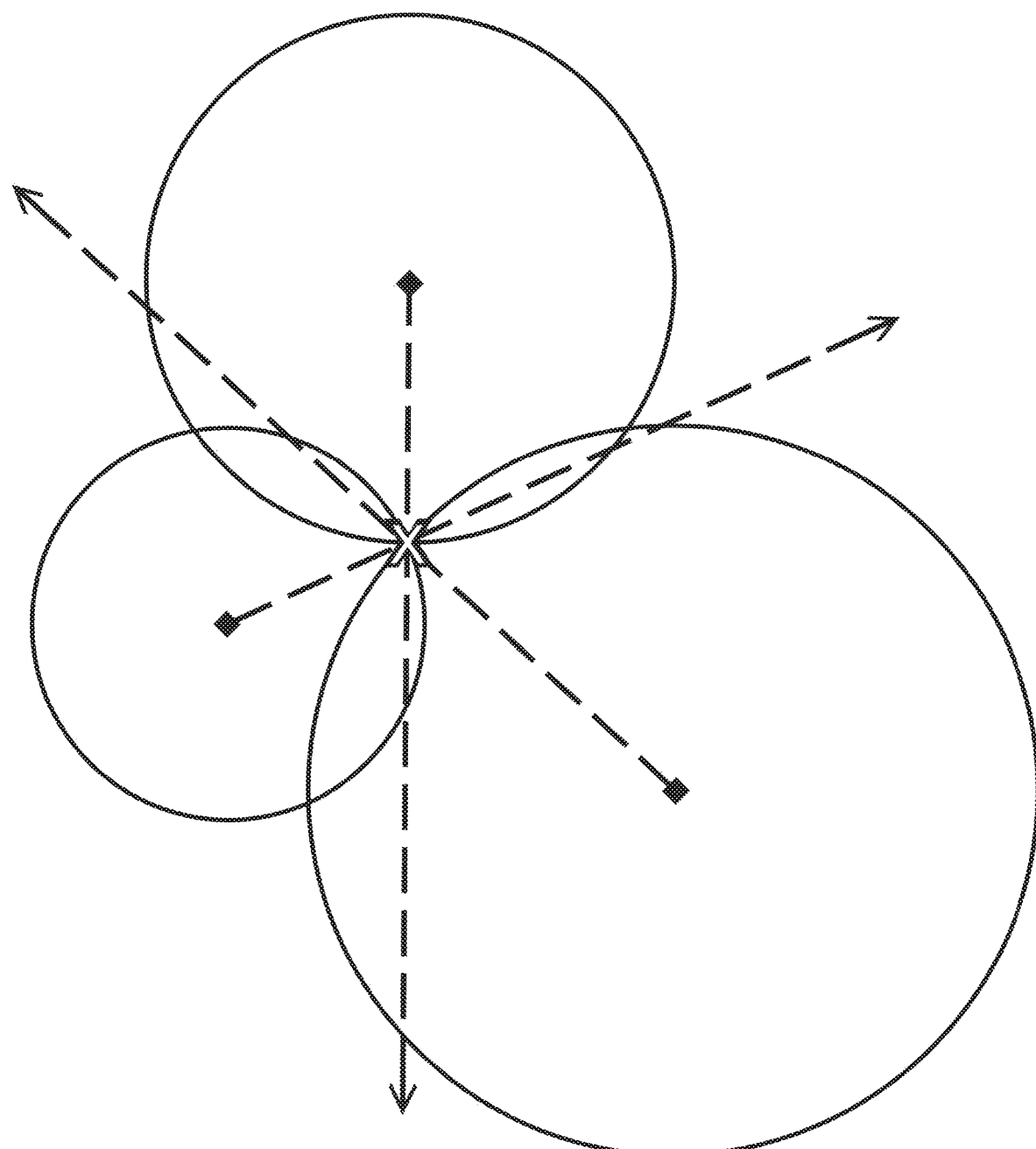
FIG. 1 graphically illustrates exemplary, trilateralization-based and triangulation-based methods for determining the location of an individual on a two dimensional plane.

Stated simply, the goal of any tracking system is to find the location of one or more targets from one or more reference points. At a simple level, FIG. 1 illustrates a method of locating a target positioned at known distances from a set of observation points commonly known as trilateralization. The location of each observation point (X symbol) is known, while only the target's distance from each observation point is known. With respect to each individual observation point, the target could be located anywhere on the respective circular boundaries shown in FIG. 1. Combining the information from at least three differently-located observation points adds additional constraints that limit the possible locations to a single location where all three circular boundaries intersect (marked by an X symbol). Trilateralization forms the basis of many terrestrial radio navigation systems. While it is difficult to illustrate, one can imagine a three dimensional system where, instead of being on respective circular boundaries, the target could be located anywhere on respective spherical boundaries centered on the respective observation points. Combining the information from at least four differently-located observation points limits the possible locations to a single location where all four spherical boundaries mutually intersect in three dimensional space. This approach forms the basis of systems like the Global Positioning System, although this is a gross oversimplification of the technical details of that system. Another method of locating a target, where only the target's direction from at least two such observation points is known, is commonly known as triangulation, where, with respect to each individual observation point, the target could be located anywhere on the respective rays shown in FIG. 1. If an observation point can determine both direction and distance, then it is possible to track a target using only a single observation point, which can be a significant advantage for reasons such as simplicity, budget, or availability of space and/or equipment. This approach forms the basis of early radar systems. However, practical systems are only able to discern a target's distance and/or direction within certain accuracies. Accordingly, multiple direction-and-distance determining observation points are sometimes used in hybrid methods broadly described as "triangulateration."

A wireless electromagnetic signal propagates through free space at c (~3×10$^8$ meters per second). By measuring the "time-of-flight" of the electromagnetic wave, i.e., the time it takes a portion of the wireless electromagnetic signal propagating from a source to reach a receiver, the distance from the source to that receiver can be calculated by the simple relationship d=t*c, where d is distance and t is time. For radar systems, where the target is a quasi-source that reflects or echoes a transmitted wireless electromagnetic signal, this technique is called pulse-delay ranging. The complication of measuring distance is that the receiver needs to know, at a minimum, when the pulse was initially transmitted from the actual source. This can be relatively simple in single observation point systems such as radar systems, where the transmitter and receiver can be co-located and thus share a signal source. However, in multiple observation point systems, each observation point, and also the target in some cases, has a separate signal source, and those signal sources must use clock synchronization or other techniques beyond relative locks to a received waveform to permit unambiguous calculations of distance. Wireless electromagnetic signal propagation can also be used to determine direction from a receiver to a source. Traditionally this would be done using a highly directional (narrow beamwidth) antenna that is mechanically rotated about a tracking area. Alternately, multiple omnidirectional or near-omnidirectional receiving antennas could be disposed in an array. Phased array antennas can be constructed using analog phase shifters for each antenna element and a combiner circuit that combines the phase shifted signals from each element. The relative phases of the antenna elements are varied by the phase shifters to sweep the look direction in the same manner that a mechanically rotated directional antenna would. A non-phased array antenna and system may instead separately analyze the signals from each antenna element to detect differences in the received phase, such as by performing an element-by-element, sequential phase analysis or electronically sampling the signals received by each antenna element, rather than steering the array look direction, effectively determining the direction of the received signal through minor differences in the time-of-flight to the individual antenna elements of the array.

Figure 2:
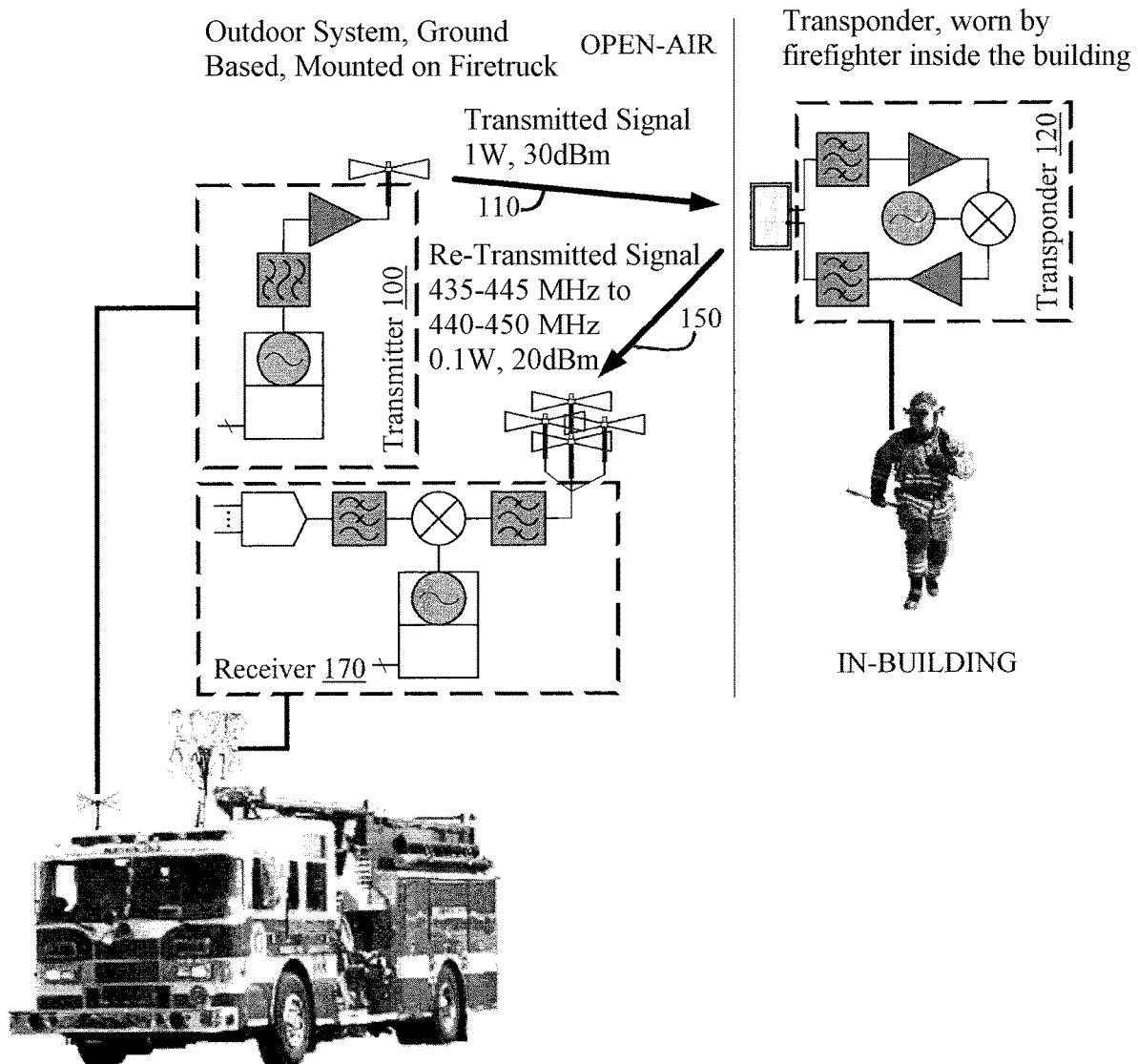
FIG. 2 is a schematic illustration of an embodiment of the disclosed system.

The disclosed systems and methods are distance-and-direction-based technologies for tracking individuals (through a worn object), other objects, and/or nominally fixed locations in three dimensional space. With initial reference to FIG. 2, the system includes a transmitter 100 that transmits a first wireless electromagnetic signal 110. The system also includes a number of transponders 120 configured to receive the first wireless electromagnetic signal 110 and, in response, emit a second wireless electromagnetic signal 150. Each transponder 120 may be a so-called-"bent-pipe transceiver," meaning that the transponder includes a frequency shift stage that re-transmits received signals at a different frequency, such that the second wireless electromagnetic signal 150 is responsively emitted by the transponder at a different frequency relative to that of the first wireless electromagnetic signal 110. The system further includes a receiver 170 that detects and processes the second wireless electromagnetic signals 150 emitted by the transponders 120 to determine a distance, azimuth or horizontal angle, and relative elevation or vertical angle between the receiver and the respective transponders 120.

The transmitter 100 transmits the first wireless electromagnetic signal 110 in the radio or microwave frequency range. The transmitter 100 may transmit the signal at a frequency that can penetrate through buildings and other structures. In one case the transmitter 100 broadcasts in a frequency range between about 200 MHz and about 12000 MHz (including UHF, L band, S band, C band, and/or X band frequencies; for open-air and outdoor environments), or in another case a frequency range between about 200 MHz and about 1000 MHz (principally UHF frequencies; for developed environments), and in one particular case a frequency range of between about 420 MHz and about 450 MHz. The later represents a band that the United States Federal Communications Commission has allocated to radio location systems. The transmitter 100 may broadcast omni-directionally in a range of power outputs, such as up to about 1 Watt in one construction. Greater power outputs may be used in open-air and outdoor environments. The transmitter may include a Field-Programmable Gate Array (FPGA), or other suitable integrated circuit such as an ASIC or Digital Signal Processor, for signal generation.

The first wireless electromagnetic signal 110 may in some cases comprise a pulsed signal and in other cases may comprise a frequency modulated continuous wave (FMCW). For a pulsed signal, the signal must be cycled on and off over an interval. The receiver 170, discussed in detail below, then determines the time delay from when the transmitter 100 transmitted a particular pulse of the first wireless electromagnetic signal 110 (with transponders 120 receiving and responsively emitting a frequency-shifted second wireless electromagnetic signal 150) and the receiver received a corresponding pulse of the second electromagnetic signal(s) 150 from the transponders 120, e.g., by comparing the start or end times of reception of the respective signals. While the delays between pulses may be reduced depending upon the desired maximum range of the system, a fixed-frequency, non-encoded signal must be pulsed because otherwise only the relative phase of the electromagnetic signals 110, 150 can be determined and the absolute distance of each transponder 120 will remain unknown. In contrast, for a FMCW signal 110, a continuous wave signal has a frequency that is continuously swept across a first frequency band, i.e., between a lower bound of the first frequency band and a different, higher bound of the first frequency band. The receiver 170 then determines the time delay from when the transmitter 100 transmitted the first wireless electromagnetic signal 110 at a particular frequency within the first frequency band (with transponders 120 receiving and responsively emitting a frequency-shifted, frequency-modulated second wireless electromagnetic signal 150) and the receiver received a second wireless electromagnetic signal 150 with a corresponding, frequency-shifted frequency within a second frequency band, i.e., a corresponding frequency between a lower bound of the second frequency band and a different, higher bound of the second frequency band. For example, the first frequency band may span 10 MHz, e.g., from 420 to 430 MHz, and the second frequency band may span 10 MHz, e.g., from 435 to 445 MHz, or, if the transponders 120 include different frequency shifts as described below, may span 15 MHz, e.g., from 435 to 450 MHz, with individual transponders operating within some but not all of the second frequency band. The FMCW signal 110 offers the advantage that tracking may be continuous and that a comparatively large number of samples may be collected within a given time interval, allowing for errors to be averaged out and for an increase in the accuracy of an output of distance and direction. In addition, transmission hardware can be simplified by not having to pulse the first wireless electromagnetic signal 110, and receiving hardware may be able to detect differences in frequency more accurately than differences in phase. Finally, depending upon the bandwidth of the first (and, correspondingly, second) frequency band, the system may be more resistant to sources of interference and multipath behaviors at specific frequencies.

The first wireless electromagnetic signal 110 may also comprise an orthogonal frequency division multiplexed (OFDM) signal. Such a signal 110 includes a plurality of sub-carriers which are distributed within a passband bandwidth of the complex OFDM signal ("orthogonally" such that the sub-carrier spacing is equal to the reciprocal of a symbol period). Advantageously, multipath effects associated with environmental obstructions or reflections will tend to affect each sub-carrier differently, such that some sub-carriers may experience relatively low multipath interference while others may experience relatively high multipath interference or so-called "deep fading." By initially transmitting and, as described below, subsequently re-emitting a frequency-shifted version of an OFDM signal, the system may more accurately estimate the distance, azimuth, and relative elevation between the receiver and transponders 120, for example, by averaging across individual sub-carrier-based estimates so as to decrease RMS error in an averaged estimate.

Figure 3:
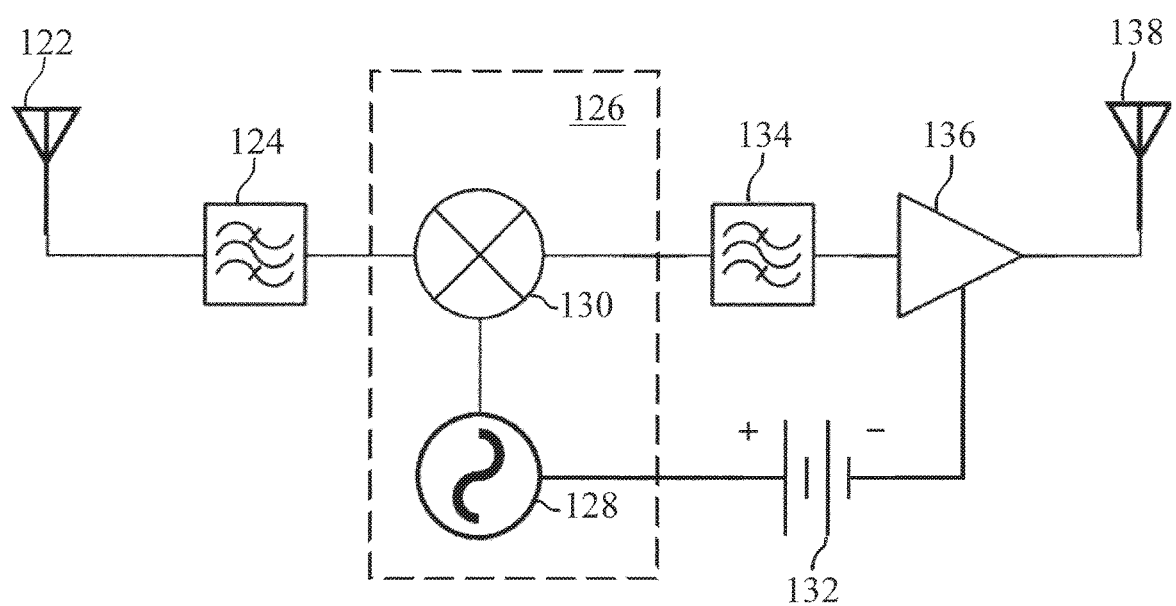
FIG. 3 is a schematic illustration of an exemplary transponder.

Upon receiving the first wireless electromagnetic signal 110, the transponders 120 responsively emit the second wireless electromagnetic signal 150 in the radio or microwave frequency range. The transponders 120 may be unpowered devices such as so-called "passive" radio frequency identification (RFID) devices in one construction. However, as shown in FIG. 3, the transponders 120 may be self-powered devices, e.g., so-called "active" RFID devices, that include the aforementioned frequency shift stage, 126, as well as a plurality of antennas (exemplary receiving antenna 122 and emitting antenna 138 are shown), a battery 132, and a signal amplifier 136. Such self-powered devices may advantageously emit the second wireless electromagnetic signal 150 with sufficient power to ensure propagation through buildings and other structures. The transponders 120 may emit omnidirectionally in a range of power outputs, such as up to about 0.1 Watt in one construction. The transponders 120 may emit at greater power outputs (after considering filter and amplifier limitations, power consumption/runtime requirements, and electromagnetic radiation safety concerns), however, the first wireless electromagnetic signal 110 may be significantly attenuated by intervening walls, equipment, and objects, so that the transponders should be able to detect a such a signal at just above the noise floor and amplify that signal within a wearable, compact, and lightweight device. Amplification to ~+10 dBm (with just over 100 dBm gain) permits the use of off-the-shelf gain stages while maintaining reasonable size, weight, and emitter performance.

The frequency shift stage 126 receives signals such as the first wireless electromagnetic signal 110 and re-transmits them at a different frequency, such that the transponder 120 emits a signal, including the responsively emitted second wireless electromagnetic signal 150, at a different frequency than that of the received signals. With respect to the first wireless electromagnetic signal 110, the emission of a frequency-shifted second wireless electromagnetic signal 150 allows the transponders 120 to function as beacons and be tracked in cluttered and lossy indoor environments. The transponders 120 may emit at a comparatively different frequency than non-moving or slowly moving environmental responses to the first wireless electromagnetic signal 110, distinguishing the second wireless electromagnetic signal(s) 150 from single- and multi-path reflections of the former signal. For example, the frequency shift stage 126 may shift the emitted signals by about 5, 10, or 15 MHz or more from the received signals. The reader will appreciate that the frequency shift may be quite small, as small as about 0.1% in some cases or less than about 1% in other cases, or less than about 10% in yet other cases. There are several advantages to keeping the frequency shift relatively small. First, the frequency range for the transmitter 100 may be selected to provide desirable properties for signal propagation, such as the ability to penetrate through buildings. By ensuring that the frequency range of the signal emitted by the transponders 120 is different than but close to the frequency range of the signal transmitted by the transmitter 100, those desirable signal propagation qualities can be maintained. Secondly, in some cases only certain frequency bands are available or approved for use. Thus the use of other similar frequencies can help to ensure that the entire system operates within a relatively narrow band of frequencies approved for use, making approval of use and compliance with operating restrictions easier.

In one construction, the frequency shift stage 126 includes a oscillator 128 and a first mixer 130, whereupon the stage mixes received signals with the output of the oscillator via the first mixer to re-transmit a frequency downshifted or upshifted signal. Accordingly, the transponders 120 may be purely analog transponders and lack any digital electronics, digital processing circuitry, digital signal processors, or the like. Other constructions, including constructions using digital signal processors to analyze the first wireless electromagnetic signal 110 and to digitally construct the second wireless electromagnetic signal 150, will be apparent to those of skill in the art. However, the disclosed "analog" transponders have the advantage that they may be used with any transmitter 100 that transmits within an appropriate frequency range, regardless of signal type, and need not understand or be updated to understand different or new signal schemes. Each transponder 120, via the oscillator 128, may be configured to emit the second wireless electromagnetic 150 signal at a different frequency relative to that of the first wireless electromagnetic signal 110 and the frequencies of the second wireless electromagnetic signals emitted by the other transponders. In one construction, the oscillator 128 may be a resistor-set adjustable oscillator, although other types of adjustable oscillator will be apparent to those of skill in the art. In one construction, the oscillator 128 may be a pluggable module, such that different oscillators may be substituted to provide different frequencies relative to that of the first wireless electromagnetic signal 110 and the frequencies of the second wireless electromagnetic signals emitted by the other transducers. For example, each transponder 120 may provide a shift in frequency including a base shift, e.g., 10 MHz from the transmitted frequency, and an incremental shift, e.g. 5 or 10 kHz, from the emitted frequencies of others of the plurality of transducers. The different-frequency second wireless electromagnetic signals allow individual transponders 120, and therefore individual persons or objects, to be tracked through the emitted frequency corresponding to that specific transponder. Although a difference of 5 kHz can provide some overlap in the emitted signals, different signals are able to be identified by the receiver 170.

The plurality of antennas, e.g., receiving antenna 122 and emitting antenna 138, may take various forms. A first construction may use patch antennas. A second construction may use a spiral antenna, such as a compact, PCB-borne spiral antenna disclosed in Compact Spiral Antenna for Space Based Applications, Antennas and Propagation Society International Symposium (APSURSI), IEEE 2014 (DOI 10.1109/APS.2014.6905180), developed by Kevin Zack et al. Separate receiving 122 and emitting 138 antennas may be disposed on opposite sides of a multilayer PCB containing a layered ground plane and vias to minimize inter-antenna coupling. A third construction uses two concentric patch antennas operated in a differential configuration. A fourth construction uses conventional monopole antennas. The referenced patch and spiral antennas are at least somewhat directional, and as a result the transponders 120 may include multiple antennas that may be disposed, for example, dorsally and ventrally on an individual, or the system may use multiple transponders disposed, for example, dorsally and ventrally on the individual. The referenced monopole antennas are omnidirectional, but frequently require that the transponder 120 include a projecting antenna rather than an internally-housed antenna.

The transponders 120 may include a receive filter 124 that limits the received signals to a set frequency range encompassing the first wireless electromagnetic signal 110. The receive filter 124 may remove undesired sources of interference and ensure that the transponder 120 does not oscillate due to its own emissions. The transponders 120 may also include an emission filter 134 to block undesired emissions and/or further reduce the potential for the transponder to oscillate due to its own emissions. In systems with both high gain (e.g., the exemplary 100 dBm gain mentioned above) and closely spaced transmitter and emitter frequencies, there should be a comparable degree of isolation between the receiving side and the emitting side, otherwise portions of the emitted signal may be the strongest signal passed to the frequency shift stage 126, and the transponders 120 may oscillate rather than function as bent-pipe transceivers. For constructions in which the frequency shift is relatively large, e.g., from a transmitting frequency of ~400 MHz to a frequency-doubled emitted frequency of ~800 MHz, the filters 124, 134 may include chip capacitors and inductors arranged to form a 3-5 pole discrete filter. However, for constructions in which the frequency shift is relatively small, the filters 124, 134 may include a high Q-factor filter (where the Q factor=the filter center frequency divided by the bandwidth passed by the filter). The receive filter 124 should have considerable attenuation at the emitting frequency of the transponder 120. Because the frequency shift stage 126 and signal amplifier 136 will amplify system noise, the emission filter 134 should have considerable attenuation at the transmitting frequency of the transmitter 100.

Figure 4:
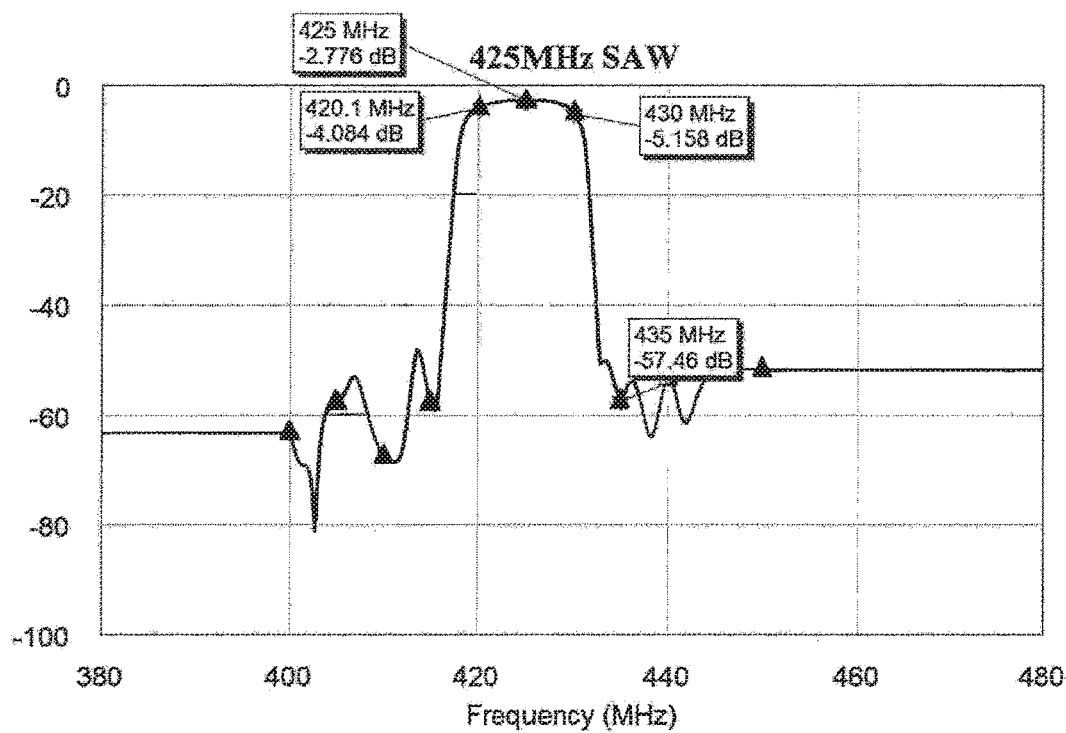
FIG. 4 illustrates insertion loss and isolation for a receive-side Surface Acoustic Wave filter of an exemplary transponder of the system.
Figure 5:
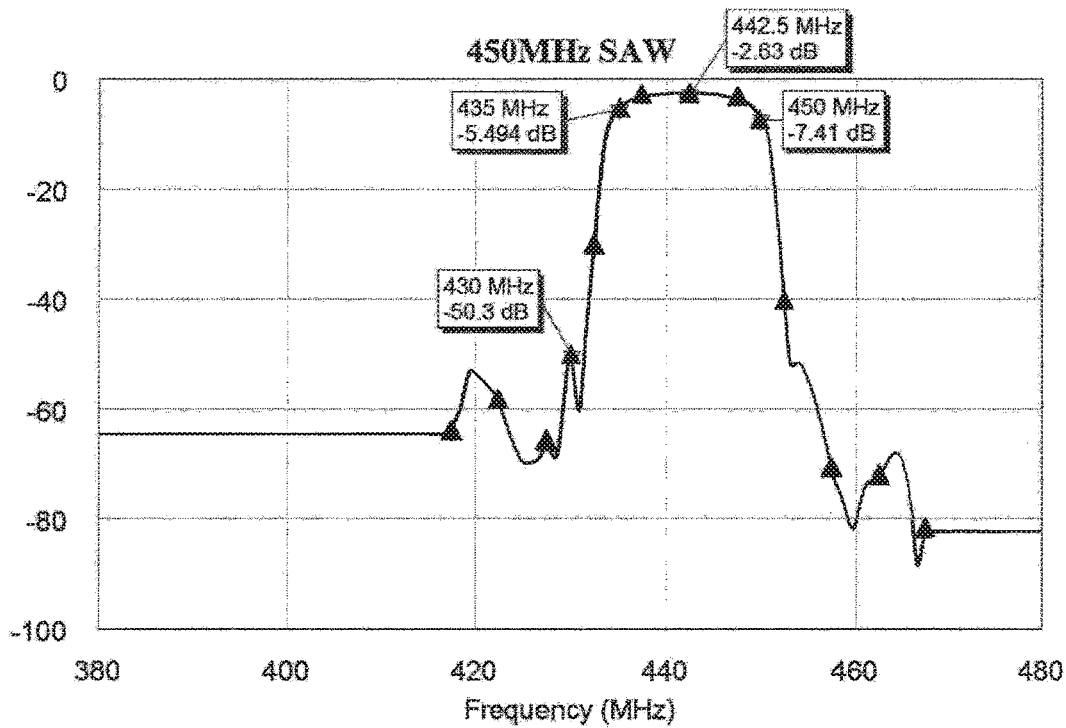
FIG. 5 illustrates insertion loss and isolation for an emitting-side Surface Acoustic Wave filter of an exemplary transponder of the system.

In one construction the filters 124 and 134 include so-called Surface Acoustic Wave (SAW) filters. In the case of the receive filter 124, a SAW filter may provide, for example, a 10 MHz passband centered at 425 MHz, 3-5 dB insertion loss in the passband, and >40 dB rejection outside the passband. FIG. 4 illustrates the performance of a prototype, exemplary SAW filter, while SAW filters are available for other frequency ranges. In the case of the emission filter 134, another SAW filter may be used to provide a filter with a 15 MHz passband centered at 442.5 MHz, 3-7 dB insertion loss in the passband, and >40 dB rejection outside the passband. FIG. 5 illustrates the performance of a prototype, exemplary SAW filter, while, again, SAW filters are available for other frequency ranges. Multiple filter elements may be cascaded to meet attenuation/rejection requirements, and amplifier elements may be inserted between such filters to minimize amplifier compression and noise. Surface-Skimming Bulk Wave SAW filters may be particularly suitable for the transponders 120, since they have decreased susceptibility to filter substrate impurities, have lower losses, and are less susceptible to temperature effects than traditional SAW filters.

Figure 6:
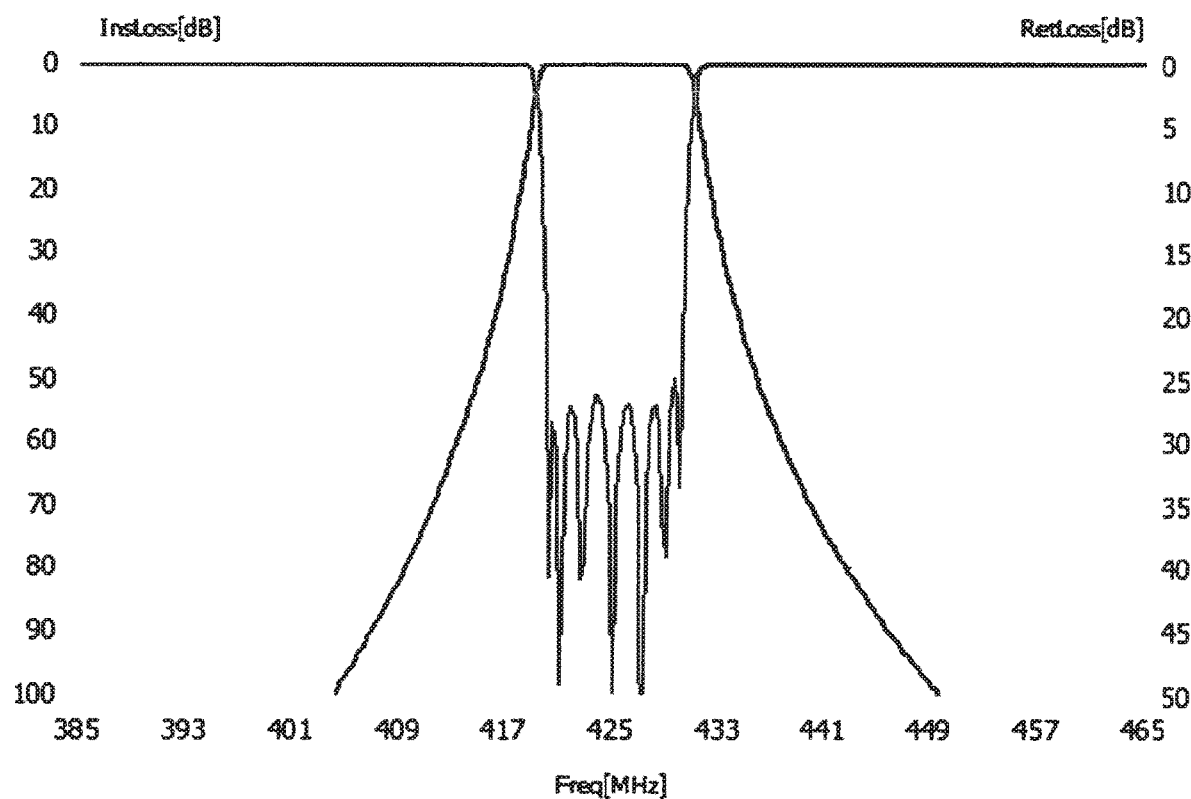
FIG. 6 illustrates isolation for a receive-side coaxial-cable-based resonant filter of another exemplary transponder of the system.
Figure 7:
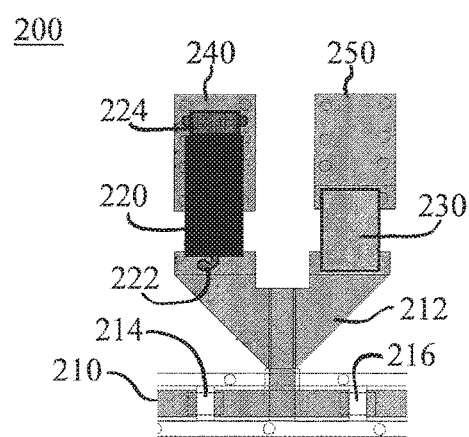
FIG. 7 illustrates a resonator unit of a receive-side coaxial-cable-based resonant filter of the exemplary transponder of FIG. 6.

In another construction, the filters 124 and 134 include coaxial resonator filters. In the case of the receive filter 124, a seven-resonator, chip capacitor-coupled coaxial filter may provide, for example, a 10 MHz passband centered at 425 MHz, low insertion loss in the passband, and exponentially increasing rejection outside the passband (>20 dB at 435 MHz). FIG. 6 illustrates the performance of a prototype, exemplary filter, while coaxial resonator filters are available for other frequency ranges. In the case of the emission filter 134, another such filter may provide a 15 MHz passband centered at 442.5 MHz. As with SAW filters, multiple filters elements may be cascaded to meet attenuation/rejection requirements, and amplifier elements may be inserted between such filters to minimize amplifier compression and noise. Alternately, a single filter may be tuned using a parallel, adjustable capacitance to alter each resonator's resonant frequency to improve rejection. The reader will appreciate that coaxial resonator filters may alternately be formed using lengths of coaxial cable, with the cable being sized to ¼ of the passband-centered wavelength (and short-circuited at one end to form a quarter wavelength resonator) or ½ of the passband-centered wavelength (and left open at one end to form a half wavelength resonator), however those elements will be physically larger (e.g., ~4.5 inches for the 420-450 MHz frequency band in quarter wavelength mode, ~9 inches in half wavelength mode) and losses will be higher. In order to reduce the areal extent of the filter, fine-diameter coaxial cables may be coiled into a helical configuration. Since the performance of such coaxial-cable-based resonator filters will be dependent upon variance about the design length, the cable-based resonator may also be tuned using a parallel, adjustable capacitance to alter the cable's resonant frequency and improve rejection. FIG. 7 shows an exemplary resonator unit 200 for a PCB-mounted cable-based resonator. The unit includes a signal line 210, a split 212 that interconnects the signal line 210 to a coaxial cable 220 and adjustable capacitor 230, and first and second ground planes, 240, 250, respectively. The center conductor 222 of the coaxial cable 220 is connected to the split 212 and the shield 224 is connected to the first ground plane 240. The adjustable capacitor is connected to the split 220 and the second ground plane 250. First and second chip capacitors 214, 216 may be provided on the signal line 210 before and after the split 212 so that the unit may be tuned in isolation from the effects of other such units in a multiple resonator coaxial filter.

Transponder Working Example 1

Figure 8:
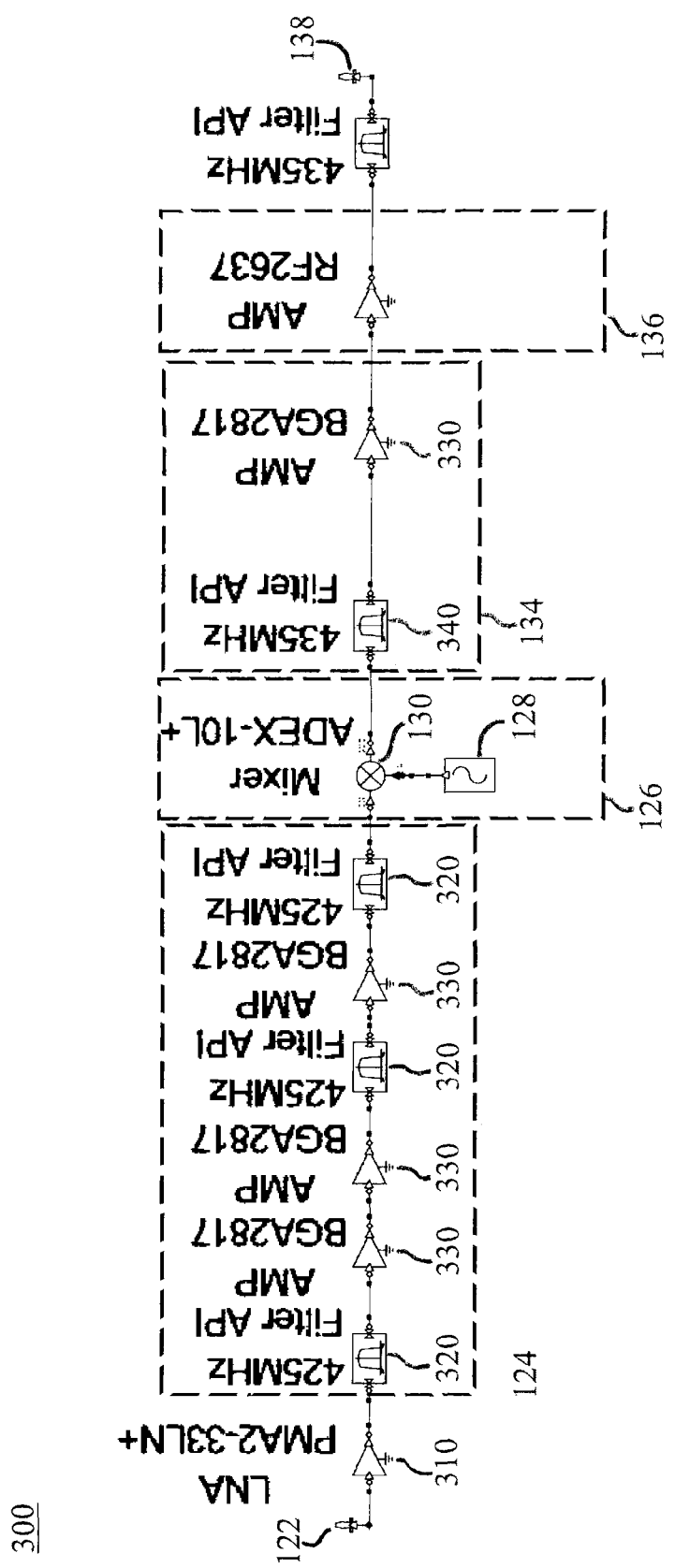
FIG. 8 is a schematic diagram of a first working example of such a transponder.

FIG. 8 is a schematic illustration of a working example 300 of a transponder 120. The receive side of the transponder includes an ultra-low noise amplifier 310 (Mini-Circuits PMA2-33LN+) which increases the gain of the signal received by a receiving antenna 122 and reduces the susceptibility of the signal to amplifier-introduced noise. The output of the amplifier 310 is passed to a receive filter 124 which includes a series of SSBW SAW filters 320 (passing the first frequency band) and wideband amplifiers 330 (NXP Semiconductors BGA 2817) to provide further amplification while reducing the effects of amplifier compression and amplifier-introduced noise. The output of the receive filter 124 is passed to a first mixer 130 (Mini Circuits ADEX-10L+) where an adjustable oscillator 128 (Linear Technologies LTC1799) provides a 1 kHz to 33 MHz feed to the local oscillator port. The frequency-shifted output of the first mixer is passed to a emission filter 134 which includes a series of SSBW SAW filters 340 (passing the second frequency band) and wideband amplifiers 330 (NXP Semiconductors BGA 2817) to provide emission amplification while reducing noise transmitted around the emitted frequency. The output of the emission filter 134 is passed to a signal amplifier 136 (Qorvo RF2637) that may include automatic gain control so as to prevent unnecessary amplification and consumption of device power. The reader will note that there may be a final emission filter-like element to reject noise potentially introduced into the signal by the signal amplifier 136. The output of the signal amplifier 136 is otherwise passed to the emitting antenna 138 for broadcast and reception by the receiver 170 of the system.

Figure 9:
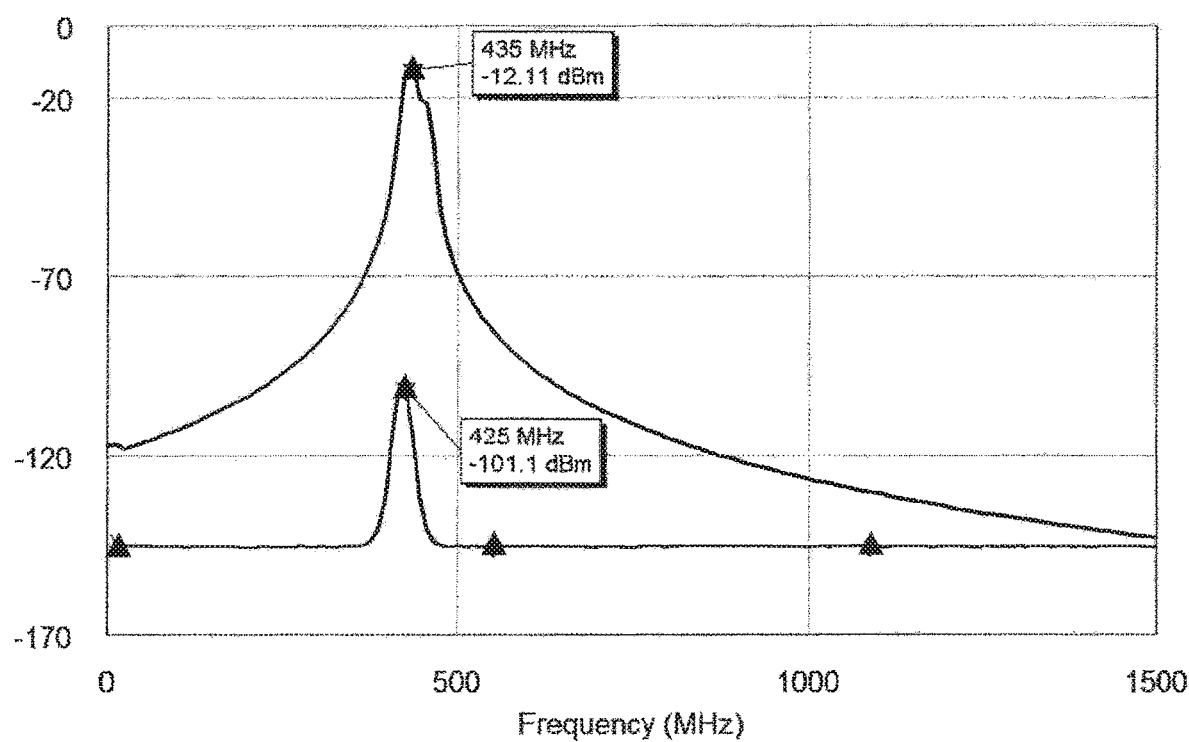
FIG. 9 is a time-averaged power spectral density plot of received and emitted signals in the working example of FIG. 8.

FIG. 9 is a time-averaged power spectral density (PSD) plot of the received and emitted signals of the transponder of the working example of FIG. 8, simulated via a model in National Instruments' AWR Visual Systems Simulator with a thermal noise floor of −144 dBm to simulate one extreme of the device's dynamic range. The bottom, received signal, at 425 MHz, is frequency shifted to 435 MHz with ~90 dB of gain. Power detector and AGC control circuits may be used to add up to 50 dB of additional gain via the Qorvo RF2637 to achieve a steady +10 dBm output.

Transponder Working Example 2

Figure 10A:
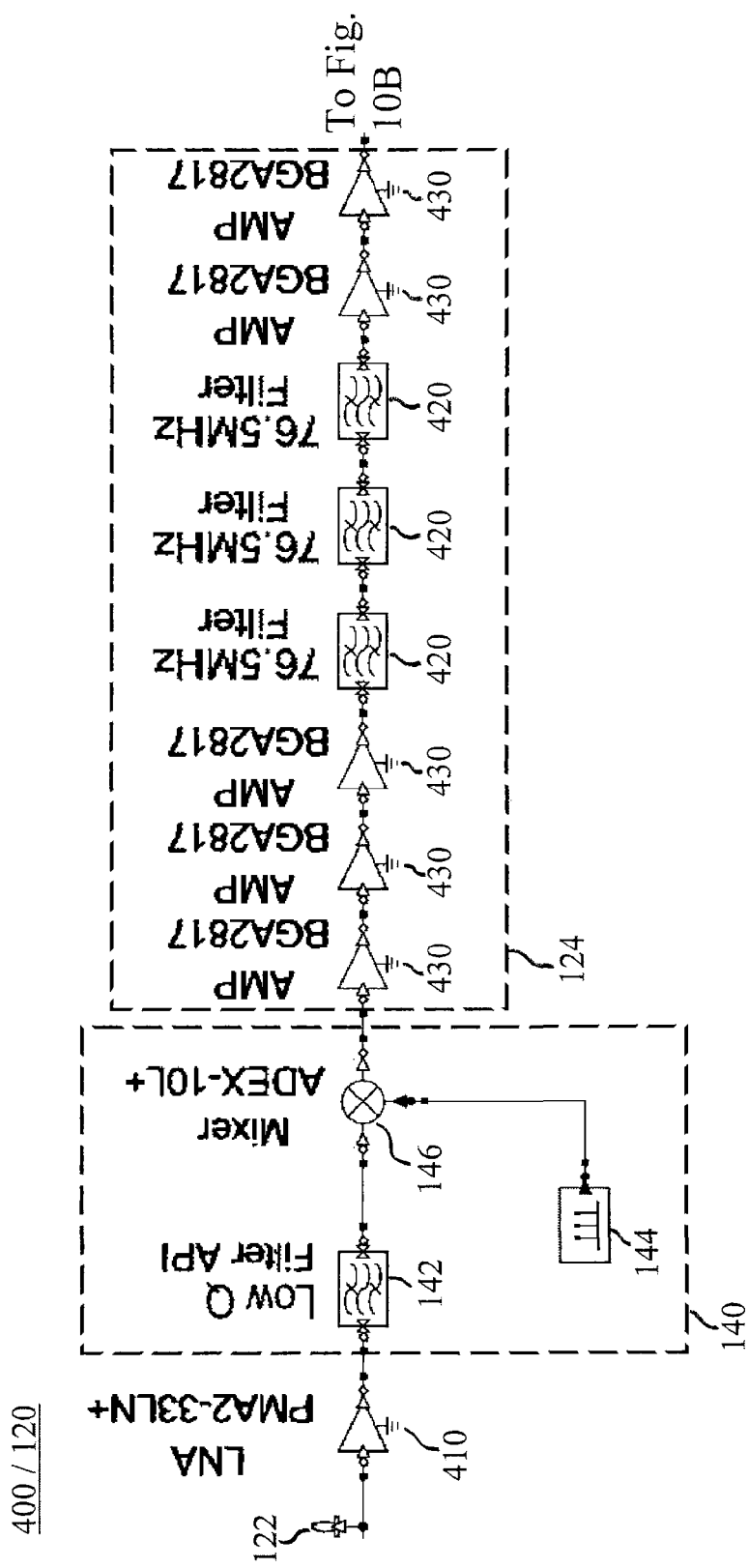
FIGS. 10A and 10B are a schematic diagram of a second working example of such a transponder.
Figure 10B:
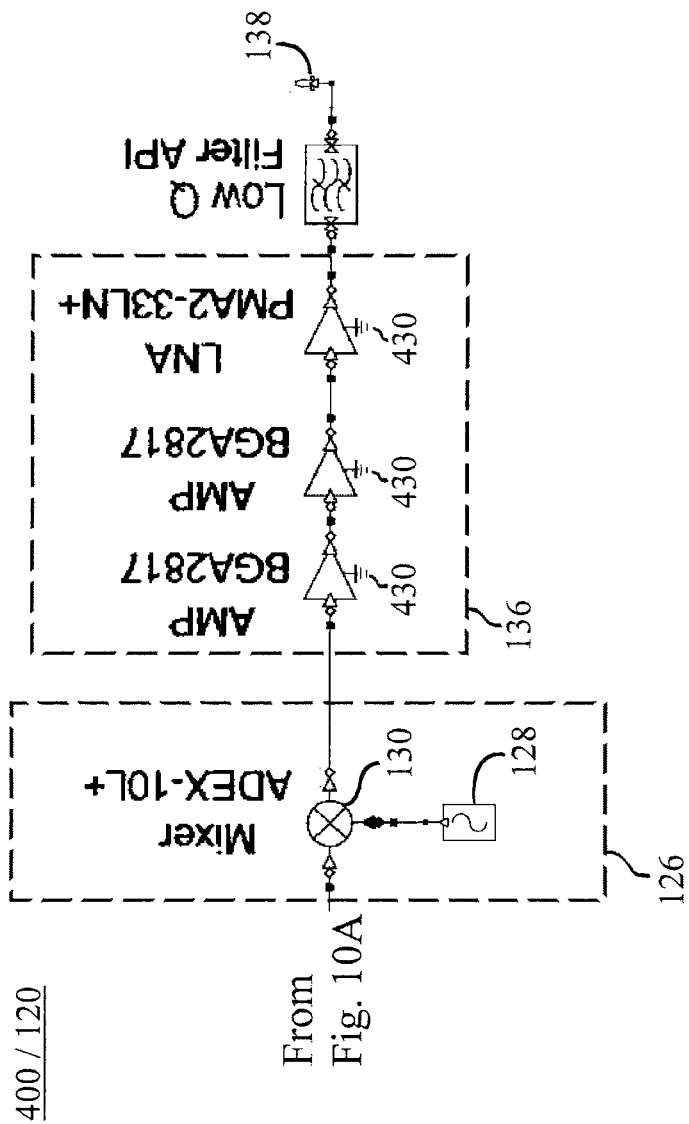

The transponders 120 may include an intermediate frequency (IF) stage 140 so that existing commercial filters may be used. Also, since Q factor is a measure of fractional bandwidth, it is frequently possible to for a given filter technology to achieve a narrower passband at lower passband center frequencies. The intermediate frequency stage may further include a pre-filter 142, which may be a low Q-factor filter, to reject noise potentially introduced into the signal by the IF stage 140 and prevent out-of-band (transmission and emission band) signal emissions. With reference to FIG. 10, a working example 400 of another transponder 120 has a receive side that includes an ultra-low noise amplifier 410 (Mini-Circuits PMA2-33LN+), as otherwise described in working example 1 above. The output of the amplifier 410 is passed to an intermediate frequency stage 140 that includes a pre-filter 142 that may comprise a series of capacitors and inductors since strong isolation of the received signal is not yet required. The output of the pre-filter is passed to the second mixer 144 (The intermediate frequency stage 140 includes a second mixer 144 (in a subordinate, not sequential sense; Mini Circuits ADEX-10L+) where a local oscillator 146 (e.g., 348.5 MHz reference oscillator) provides feed to the local oscillator port. The frequency-downshifted output of the second mixer 164 is passed to a receive filter 124 which includes a series of SAW filters 420 (MuRata SF2038B) and wideband amplifiers 430 (NXP Semiconductors BGA 2817) to provide further amplification while reducing the effects of amplifier compression and amplifier-introduced noise. The output of the receive filter 124 is passed to a first mixer 126 (Mini Circuits ADEX-10L+) where an adjustable oscillator 128 (Linear Technologies LTC1799) provides an 368.5 MHz feed (adjustable to lesser and greater frequencies to provide different emitted frequencies) to the local oscillator port. The frequency-shifted output of the first mixer 126 is passed, without use of an emission filter 134, to a signal amplifier 136 that, in this construction, includes a series of wideband amplifiers 430 (NXP Semiconductors BGA 2817s with a final Mini-Circuits PMA2-33LN+ to avoid signal compression). The reader will appreciate that, as in working example 1 above, a signal amplifier 136 including automatic gain control could be substituted within the series. The reader will note that there may be a final low-Q filter element to reject noise potentially introduced into the signal by the signal amplifier 136 and prevent out-of-band (transmission and emission band) signal emissions. The output of the signal amplifier 136 is otherwise passed to the emitting antenna 138 for broadcast and reception by the receiver 170 of the system.

Figure 11:
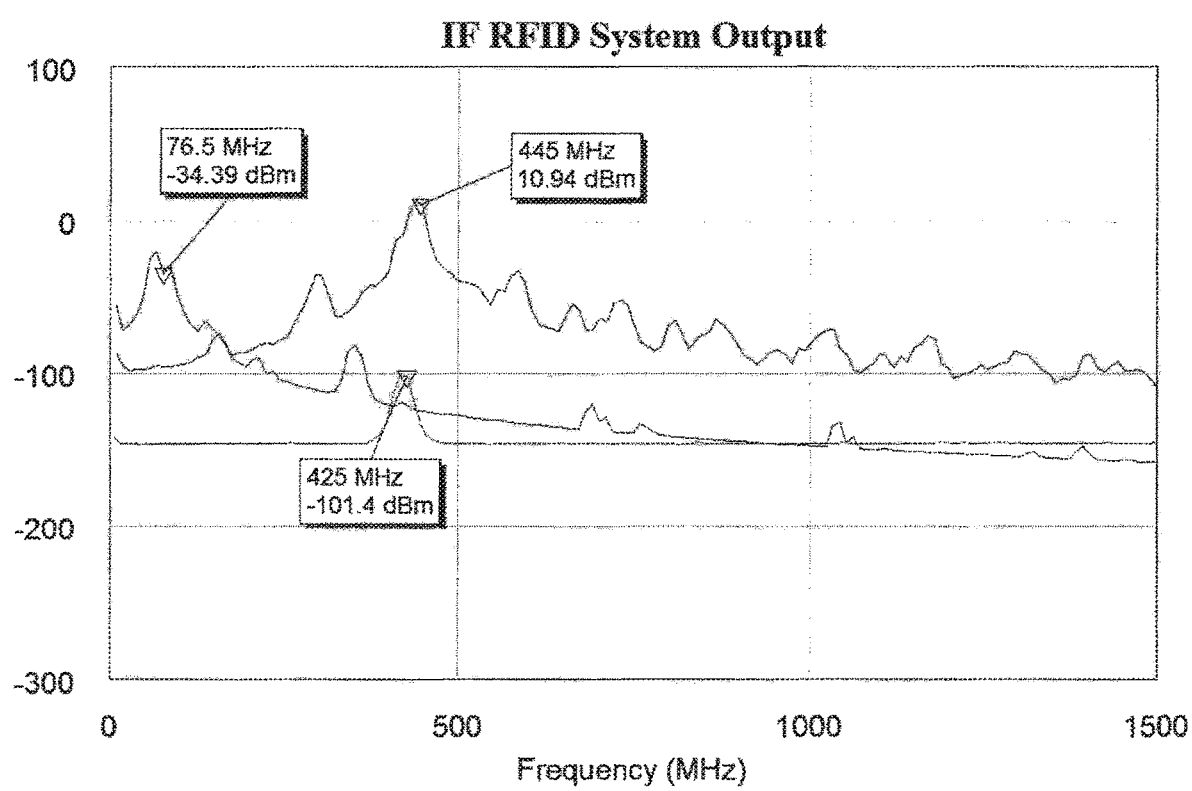
FIG. 11 is a time-averaged power spectral density plot of received and emitted signals in the working example of FIGS. 10A and 10B.

FIG. 11 is a time-averaged power spectral density (PSD) plot of the received and emitted signals of the transponder of the working example, again simulated via a model in Visual Systems Simulator with a thermal noise floor of −144 dBm. From the left hand side of the figure, the bottom, received signal, at 425 MHz, is frequency shifted to the middle, emitted signal, at 445 MHz with ~110 dB of gain. The top, intermediate frequency signal is shown for reference, but not significantly emitted by the transponder.

The reader will appreciate that the aforedescribed amplifier and filter elements may be included in various orders and combinations based upon a target frequency shift, a target gain, a target isolation between received and emitted signals, the performance characteristics of commercially available versus custom components, and the like. The components may be interconnected with coplanar waveguides or conductor-backed waveguides so as to have an ~50 Ohm impedance with line widths compatible with surface mount components. For example, the working examples employ a 1.6 mm FR4 PCB with a 57.5 mil conducting track linewidth, 10 mil gaps to the return conductors, and 0.7 mil line thickness to provide a 55 Ohm circuit that could be interfaced directly with discrete chip components. Coplanar waveguides and conductor-backed waveguides also advantageously allow for increased isolation between the stages of the transducer 120 due to the presence of return conductors, the ground plane, and/or stitching vias.

Figure 12:
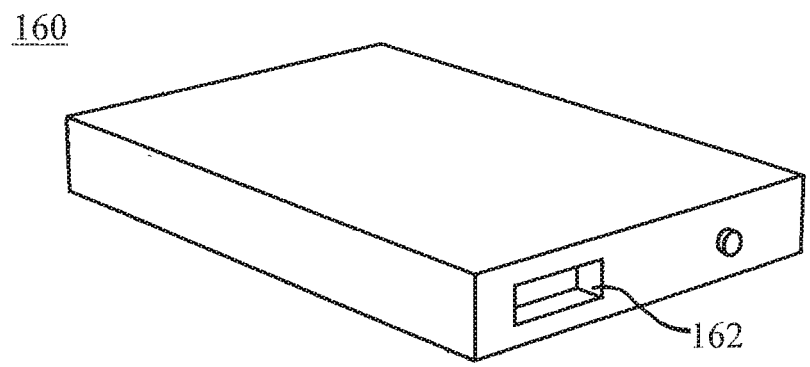
FIG. 12 is an exemplary housing and form factor for such a transponder.

The transponder electronics, potentially including the antennas 122 and 138, are contained within a housing 160, such the one shown in FIG. 12. The housing 160 should be transparent to the radio and/or microwave frequency range, based upon the frequencies of the first and second wireless electromagnetic signals, and may be constructed from fiberglass or nylon weave, for example. The battery 132 may be a removable battery with a non-flammable electrolyte chemistry, such as LiFePO4 32650 cells or alkaline C and D cells. The housing 160 may include a port 162 through which an adjustable oscillator 128 may be set or a modular, pluggable oscillator 128 may be substituted in order to set the frequency of the emitted, second wireless electromagnetic signal of the transponder 120.

The receiver 170 receives and detects the response signals emitted by the transponders 120. As noted above, the emitted second wireless electromagnetic signals 150 are frequency-shifted form the transmitted first wireless electromagnetic signal 110, making the response signals easy to identify and enabling the transponders 120 to act as beacons. In addition, as noted above, the response signals emitted by each transponder 120 may be uniquely frequency shifted relative to all of, or even only some of, the other transponders in the system, enabling the receiver to identify individual transponders and persons. The beacon-like quality of the response signal emitted by each transponder 120 enables the receiver 170 to identify azimuth (or horizontal angle) of the beacon/transponder, the relative elevation (or vertical angle) of the beacon/transponder, and the time-of-flight of response signals emitted by the beacon/transponder.

Figure 13:
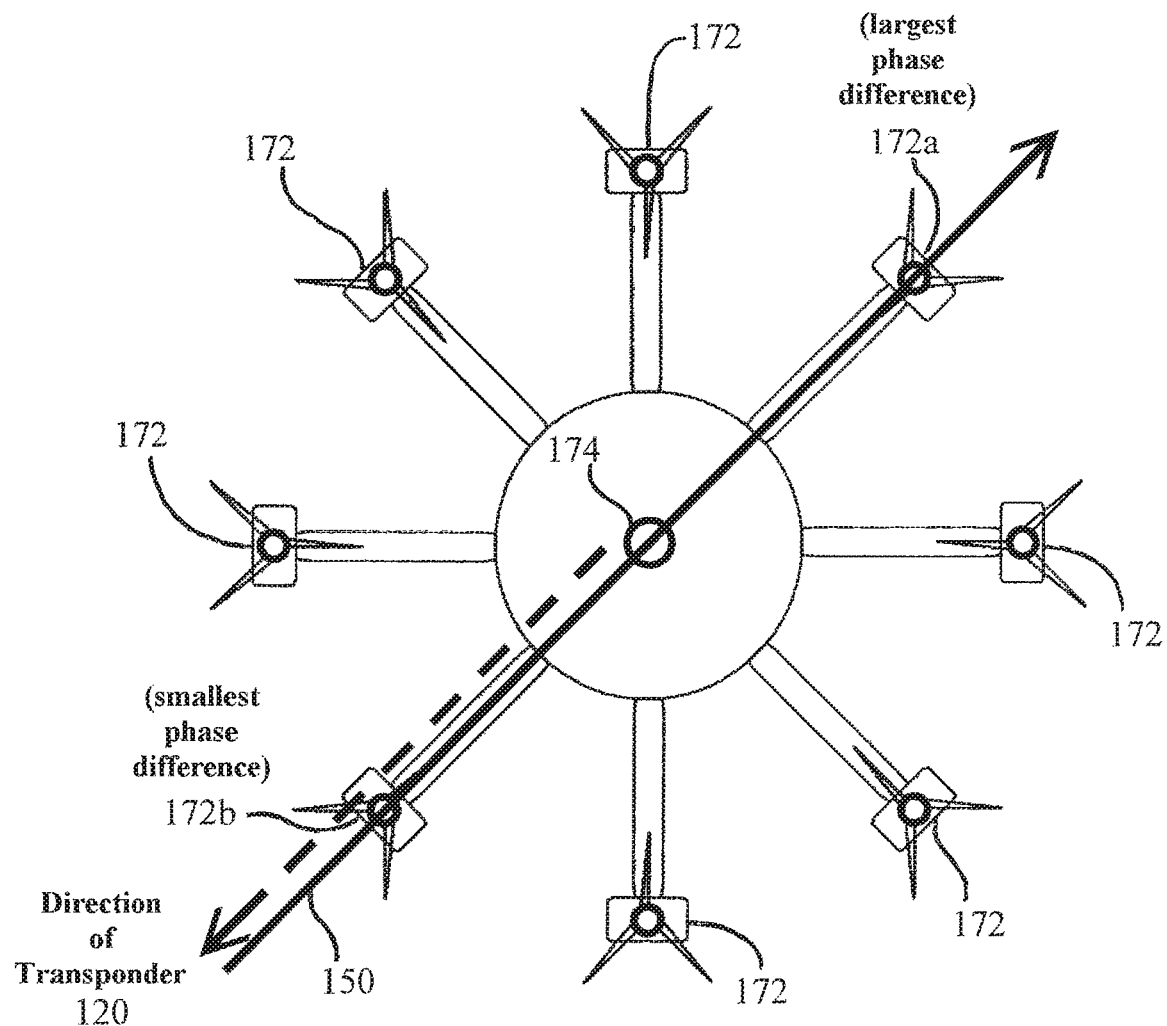
FIG. 13 is an exemplary receiver antenna arrangement.

The receiver 170, an example of which is shown in FIG. 13, includes at least three receiving antenna elements 172 arranged about a center point. A calibration antenna 174 may be disposed proximate to the center point so that a sample signal may be broadcast from the calibration antenna and phase measurements taken at the receiving antenna elements 172. The reader will appreciate that the exemplary antenna system may be used to identify the horizontal angles or azimuths to the transponders 120 and the times-of-flight of response signals emitted by the transponders, but not the vertical angles of altitudes of the transponders. At least one additional receive antenna element 172 may be disposed above or below the illustrated antennas to permit identification of such vertical angles or altitudes. In one construction, the receive antenna elements may be configured as a pyramid, e.g., a triangular, square, or higher-edge-numbered, regular or potentially irregular pyramidal arrangement. In another construction, the receive antenna elements 172 may be configured as a bipyramid, e.g., a triangular, square, or higher-edge-numbered, regular or potentially irregular bipyramidal arrangement. In yet another construction, the receive antenna elements 172 may be configured in two or more vertically-separated layers, with the layers being arranged identically, in a rotated aspect, or potentially differently with respect to other layers. The arrangement of the receiving antenna elements 172 is used to triangulate or triangulaterate the location of the transponders 120. The calibration antenna 174 may be used to normalize any variance in the receiving electronics of the receiver based upon the known arrangement of receiving and calibration antennas.

The receiver 170 may include a Field-Programmable Gate Array (FPGA), or other suitable integrated circuit such as an ASIC or Digital Signal Processor, for signal analysis. By measuring the overall phase delay between the transmitted first wireless electromagnetic signal 110 and the emitted second wireless electromagnetic signals 150, the distances to the transducers 120 can be calculated. So long as the placement of the transmitter 100 relative to the receiver 170 is known, the difference in time-of-flight of the first wireless electromagnetic signal 110 from the transmitter 100 to a respective transponder 120 from the time-of-flight of the second wireless electromagnetic signal 150 from the respective transponder 120 to the receiver 170 can be accounted for and distance to the respective transponder identified. By measuring the relative phase of respective second wireless electromagnetic signals 150 at each receiving antenna element 172, at least an approximate horizontal angle or azimuth to the respective transponder 120 can be identified. For example, as shown in FIG. 12, a vector drawn from the receiving antenna 172a measuring the greatest phase shift to the receiving antenna 172b measuring the least phase shift will point approximately toward the respective transponder. Interpolation, or in arrangements such as the aforementioned pyramidal, bipyramidal, or layered arrangements of receiving antennas 172, triangulation, triangulateration, or other mathematical techniques based upon models of the arrangement, may be used for to increase the accuracy of the identified horizontal angle or azimuth and vertical angle or elevation. In cases where the transmitted first wireless electromagnetic signal 110 and the emitted second wireless electromagnetic signals 150 comprise OFDM signals, such methods may be applied to each of the plurality of sub-carriers of the second wireless electromagnetic signal 150 and simple averages of the estimated distance, azimuth or horizontal angle, and relative elevation or vertical angle, respectively, used to reduce the RMS error of the averaged estimate. Alternately, the OFDM signal components may be analyzed and any significantly delayed/obscured sub-carrier signals rejected, with such methods being applied to the remainder of the plurality of sub-carriers of the second wireless electromagnetic signal 150 so that qualified averages of the estimated distance, azimuth or horizontal angle, and relative elevation or vertical angle are determined.

The receiver 170 may be operatively coupled to the transmitter 100 (and, if not physically coupled to the transmitter, programmed to determine or receive as an input the distance between the two) so that the receiver can determine and analyze time-of-flight information for wireless electronic signals emitted by each transponder 120; and in this manner analyze the distance to the various transponders. For instance, the receiver 170 and transmitter 100 may be disposed upon the same vehicle, such as a firetruck, or upon the same vehicle-towable carrier, such as a trailer. Alternately, the receiver 170 and transmitter 100 may be coupled to separate vehicles, to a vehicle and separable vehicle-towable carrier, or to separate moveable carriers, such as protective or so-called hard cases. When disposed upon the same vehicle or towable carrier, the distance and relative orientation of the receiver 170 and transmitter 100 may be known and pre-programmed into the system, allowing the system to determine and subtract time-of-flight of the first wireless signal 150 from the transmitter 100 respective transponders 120. When disposed on separate or separable carriers, GPS locators may be used to locate and supply the locations of the receiver 170 and transmitter 100 to the system, or the system may be programmed to self-determine the distance and relative direction of the transmitter 100 from the receiver 170. Since each transponder 120 can be relatively simple and analog, there is no (or very little) delay for each transponder between receiving the wireless electromagnetic signals transmitted by the transmitter and emitting its own wireless electromagnetic signal in response. Moreover, if there is any sort of delay, again since the transponder can be analog and very simple, the delay can be known and predictable, and can be easily accounted for in time-of-flight calculations. Thus, by determining the elevation, the azimuth, and the distance to the emitter of a response signal, the location of each transponder 120 can be determined in a three dimensional space.

The receiver 170 is configured to produce an output that may be communicated to a human user in a variety of manners. In one case the receiver 170 is operatively coupled to a display screen or an output device such as a tablet device, a mobile phone, a desktop computer, a laptop computer, or the like. In this case a 2-D (including a numerical representation of relative elevation) or 3-D representation of the surrounding space may be provided and displayed, and the position of each transponder 120 (and/or the individual or item to which the transponder is attached) also displayed relative to the surrounding space. The locations of transponders 120 relative to each other and/or the building and/or other geographic indicators, such as streets or GIS data, can be provided. The locations of each of the transponders 120 may be displayed, or only certain operator-selected transponders, based on their qualities/characteristics (e.g., firefighters within a certain battalion; first responders other than firefighters or vice versa, firefighters showing certain risk factors, or the like). Identifying information may also be displayed; for example the name of each individual may be displayed, or may be available for display if selected by the operator.

A variety of public service and industrial occupations may benefit from a tracking system capable of precisely tracking the location and movement of various individuals or objects in mixed indoor/outdoor worksites. The present field-deployable system specifically addresses the needs of tracking personnel working in such mixed indoor/outdoor environments, and can increase the safety and efficiency of personnel working at such sites, especially in the case of critical operations such as firefighting or first response. Individuals can be alerted if they are entering an unsafe area; help can be sent if an individual is determined to not be moving; and the location of injured or incapacitated individuals can be accurately reported in order to assist with rescue by others.

Having described the invention in detail and by reference to the various embodiments, it should be understood that modifications and variations thereof are possible without departing from the scope of the claims of the present application.

What is claimed is:

1. A wearable-transponder comprising:
a receive antenna configured to receive, in a first frequency band, a first wireless electromagnetic signal having a first signal frequency, the first wireless electromagnetic signal received from a transmitter that sweeps in frequency within the first frequency band including the first signal frequency, the first frequency band including the first signal frequency selected to propagate through a building and towards the wearable-transponder while being worn by an individual entering the building;
a low-noise amplifier including a low-noise amplifier input and a low-noise amplifier output, the low-noise amplifier input coupled to the receive antenna to amplify the received first wireless electromagnetic signal;
a receive filter including a receive filter input and a receive filter output, the receive filter input coupled to the low-noise filter output, the receive filter having a passband configured to pass signals within the first frequency band including the first signal frequency;

an intermediate frequency stage coupled to the receive filter output, wherein the intermediate stage mixes the first wireless electromagnetic signal to output one or more intermediate frequency electromagnetic signals to enable intermediate frequency processing of the one or more intermediate frequency electromagnetic signals;

a frequency shift stage coupled to the intermediate frequency stage, wherein the frequency shift stage mixes the processed one or more intermediate electromagnetic signals to produce a second wireless electromagnetics signal, the second wireless electromagnetic signal having a second signal frequency that comprises a frequency-shifted, repeated version of the first wireless electromagnetic signal, wherein the second signal frequency includes a base frequency shift and an incremental frequency shift, wherein the incremental frequency shift is unique to the wearable-transponder to enable identification of the wearable transponder from other wearable-transponders; and a transmit antenna configured to transmit, in a second frequency band, the second wireless electromagnetics signal towards a receiver to enable detection of the first and second wireless electromagnetic signals and localization of the individual wearing the wearable-transponder.

2. The wearable-transponder of claim 1, wherein the first wireless electromagnetic signal comprises a frequency modulated continuous wave, and the second wireless electromagnetic signal comprises a frequency-shifted version of the frequency modulated continuous wave.

3. The wearable-transponder of claim 1, wherein the first wireless electromagnetic signal is received at the first signal frequency between 200 MHz and 1000 MHz.

4. The wearable-transponder of claim 1, wherein the first frequency band is from 420 MHz to 430 MHz.

5. The wearable-transponder of claim 1, wherein the frequency shift stage comprises an oscillator and a mixer configured to produce the second wireless electromagnetic signal.

6. The wearable-transponder of claim 5, wherein to provide the base frequency shift and the incremental frequency shift such that the incremental frequency shift is unique to the wearable-transponder, the oscillator of the wearable-transponder has a different frequency relative to the oscillators of the other wearable-transponders.

7. The wearable-transponder of claim 6, wherein the oscillator comprises at least one oscillator adjustable to a plurality of different frequencies.

8. The wearable-transponder of claim 1, wherein the wearable-transponder is configured to emit the second wireless electromagnetic signal with the second signal frequency of between 200 MHz and 1000 MHz.

9. The wearable-transponder of claim 1, wherein the second wireless electromagnetic signal is transmitted in the second frequency band between 435 MHz and 450 MHz.

10. The wearable-transponder of claim 1, wherein the first signal frequency and the second signal frequency differ by at least 5 MHz.

11. The wearable-transponder of claim 1, wherein the receiver includes a plurality of antenna elements distributed across a three dimensional volume of space, and the receiver is configured to estimate the localization including a distance, a horizontal angle, and a vertical angle between the receiver and the wearable-transponder, wherein the estimate is based upon analysis of a phase delay between the first wireless electromagnetic signal and the second wireless electromagnetic signal as received by the plurality of antenna elements.

12. The wearable-transponder of claim 1, further comprising an emission filter coupled to the frequency shift stage and coupled to a transmit amplifier, wherein the transmit amplifier is further coupled to the transmit antenna.

* * * * *